United States Patent [19]

McIlrath

[11] 4,068,415
[45] Jan. 17, 1978

[54] RAIL CUTTING APPARATUS
[75] Inventor: William P. McIlrath, Racine, Wis.
[73] Assignee: Racine Railroad Products, Inc., Racine, Wis.
[21] Appl. No.: 648,749
[22] Filed: Jan. 12, 1976
[51] Int. Cl.² .............................................. B24B 23/02
[52] U.S. Cl. .................................. 51/178; 51/241 LG
[58] Field of Search ............. 51/178, 241 LG, 241 S, 51/241 R; 83/473, 474, 475, 490, 745; 30/166 A, 372; 408/105, 104, 188

[56] References Cited
U.S. PATENT DOCUMENTS

| 389,149 | 9/1888 | Higley | 30/372 X |
|---|---|---|---|
| 470,779 | 3/1892 | Calef | 30/166 A |
| 564,297 | 7/1896 | Whitfield | 83/490 |
| 766,725 | 8/1904 | O'Neil | 30/372 X |
| 2,081,360 | 5/1937 | Mall | 51/241 LG |
| 2,214,141 | 9/1940 | Mall | 51/241 LG |
| 3,073,073 | 1/1963 | Van Pelt | 83/745 X |
| 3,974,596 | 8/1976 | Peron | 51/241 LG |

Primary Examiner—Al Lawrence Smith
Assistant Examiner—Nicholas P. Godici
Attorney, Agent, or Firm—Wegner Stellman, McCord, Wiles & Wood

[57] ABSTRACT

A rail cutting apparatus including a base adapted to be disposed on the head of a rail. Opposed, inwardly directed fingers are located on the base for disposition about the head of the rail and the fingers on at least one side of the base are movable towards the opposed fingers. A clamp is provided to clamp the fingers about the head of a rail and a pair of links having adjacent ends pivotally interconnected for relative rotation about an axis generally parallel to the direction of elongation of the head of a rail are pivotally connected to the base for limited rotation about an axis parallel to the previously mentioned axis. A cutting tool is pivotally connected to one of the links remote from the base such that when the apparatus is clamped to a rail, the cutting tool may be swung to either side of the rail to cut the rail without removing the apparatus from the rail.

3 Claims, 4 Drawing Figures

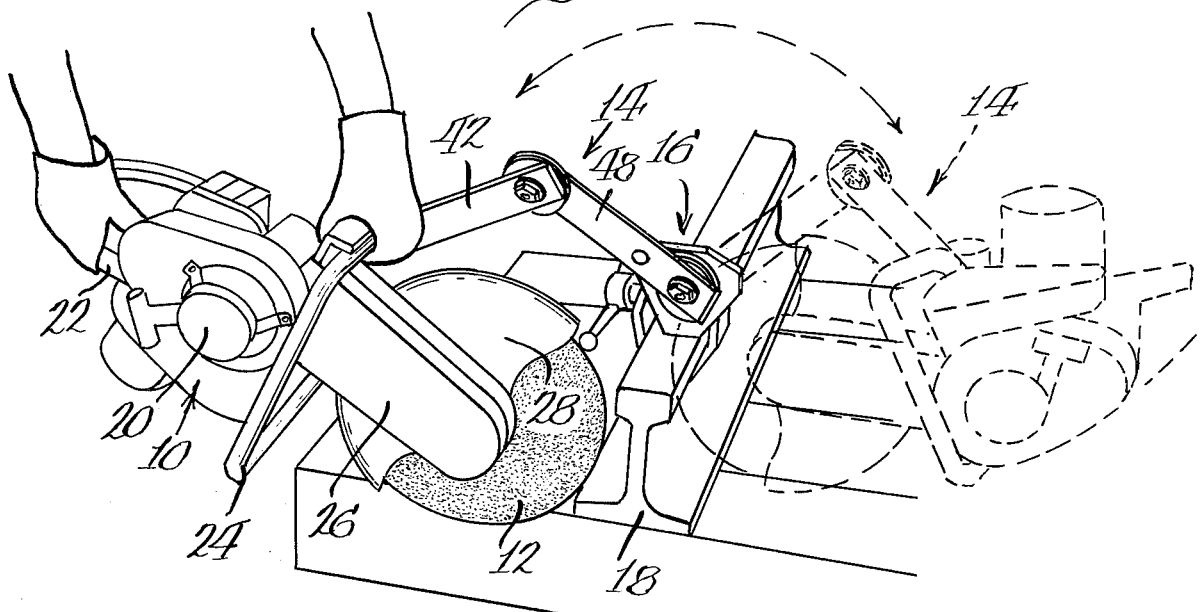
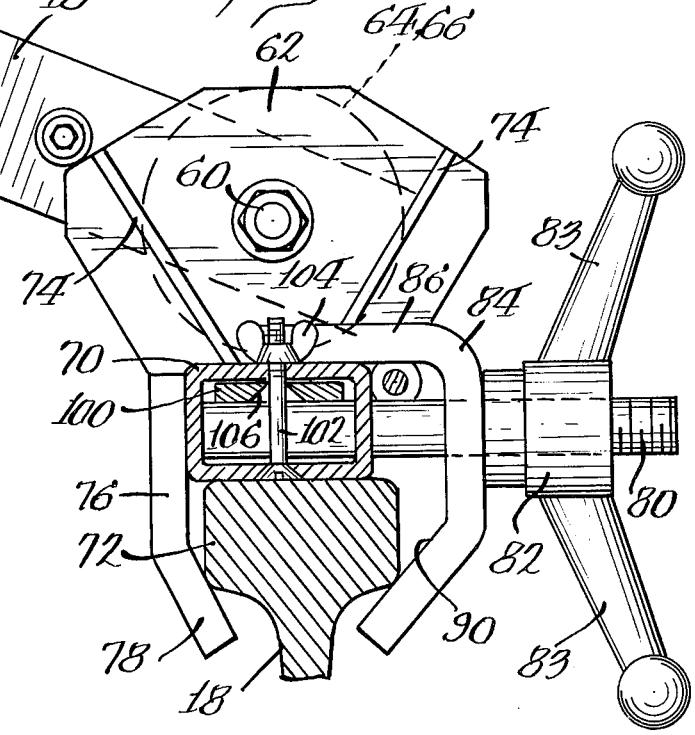
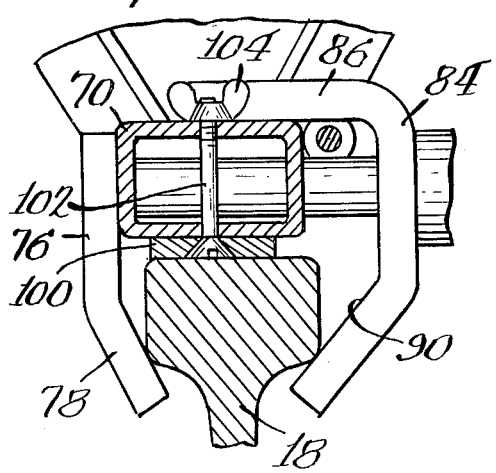

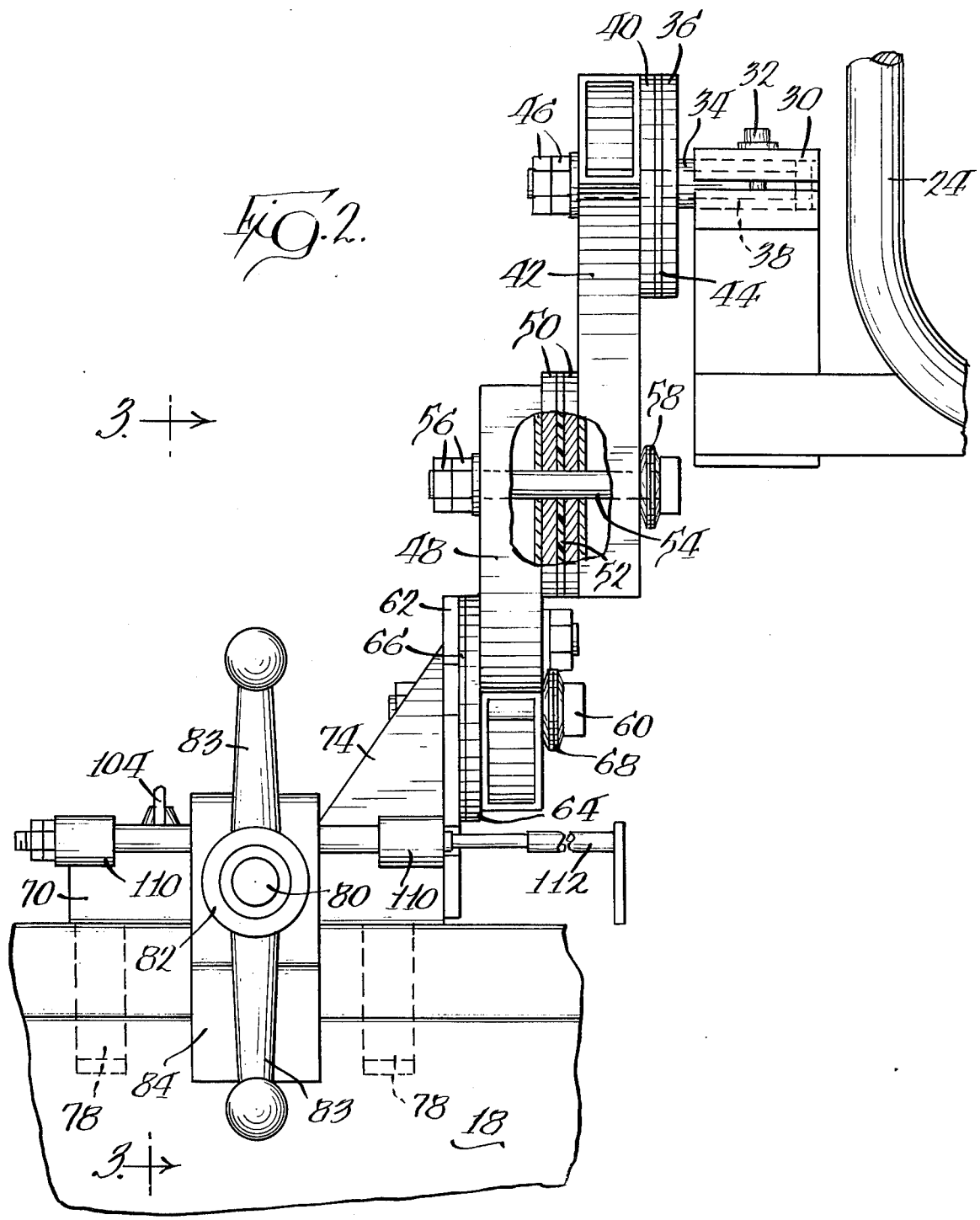

RAIL CUTTING APPARATUS

BACKGROUND OF THE INVENTION

This invention relates to railroad rail cutting apparatus, and, more particularly, to rail cutting apparatus of the type adapted to be clamped to a rail prior to commencement of the cutting operation.

Many railroad right-of-way maintenance and construction operations must be performed in situ. For example, rails frequently must be cut to size after being secured to ties in the conventional manner in a right-of-way. In the past, this has proved to be a difficult, time-consuming operation which is becoming increasingly costly due to the ever-increasing cost of labor.

SUMMARY OF THE INVENTION

It is the principal object of the invention to provide a new and improved rail cutting apparatus which may be employed in the cutting of rails, in situ, in railroad rights-of-way. More particularly, it is an object of the invention to provide such a rail cutting apparatus wherein the time, and, thus, the labor, required to cut a rail is minimized.

It is also an object of the invention to provide such a cutting apparatus which is readily adaptable to rails of varying sizes.

An exemplary embodiment of the invention achieves the foregoing objects in a construction including a base adapted to be disposed on the head of a rail. Opposed, inwardly directed fingers are located on the base for disposition about the head of the rail. The fingers on one side of the base are movable towards the fingers on the opposite side of the base and means are provided for applying a clamping force to the fingers to clamp the base to the head of a rail. Linkage means are pivotally connected to the base and to a cutting tool whereby the cutting tool, when the base is clamped to a rail, may be swung to either side of the rail for cutting purposes without removing the apparatus from the rail, thereby minimizing the time required to cut through a rail.

In a preferred embodiment of the invention, the linkage means is defined by a pair of pivotally interconnected links. The base includes an upright plate and a stop is carried by the linkage and positioned for engagement with the plate on the base to limit rotation of the linkage relative to the base to assist in supporting the cutting tool in a desired range of movement.

In a preferred embodiment of the invention, the fingers on the base define a rail-receiving channel and means are provided for selectively varying the depth of the channel to accommodate rails of varying sizes. In a highly preferred embodiment of the invention, the base is an open ended tube and the means for varying the depth of the channel comprise an adapter plate which is adapted to be interposed between the base and a rail head together with means for selectively securing the adapter plate in a first position against the underside of the base and a second position stored within the tube defining the base.

Other objects and advantages will become apparent from the following specification taken in connection with the accompanying drawings.

DESCRIPTION OF THE DRAWINGS

FIG. 1 is a perspective view of a rail cutting apparatus made according to the invention applied to a rail in a railroad right-of-way;

FIG. 2 is an enlarged, fragmentary elevation of a portion of the apparatus with parts broken away for clarity;

FIG. 3 is a fragmentary, sectional view taken approximately along the line 3—3 of FIG. 2; and FIG. 4 is a fragmentary view similar to the view of FIG. 3 illustrating the use of an adapter plate.

DESCRIPTION OF THE PREFERRED EMBODIMENT

An exemplary embodiment of a rail cutting apparatus made according to the invention is illustrated in FIG. 1 and, in general terms, is seen to include an engine, generally designated 10 for driving abrasive cutting disc 12. A linkage, generally designated 14, at one end pivotally mounts the engine 10 and, at its other end, is pivotally connected to a clamp, generally designated 16. As illustrated, once clamped to a rail 18, the apparatus may be employed to cut the rail 18 from either or both sides simply by swinging the same to either the solid or dotted line positions illustrated in FIG. 1.

Preferably, the engine 10 is provided with a recoil starter 20 of conventional construction, a combined handle and throttle pistol grip 22 and a gripping bar 24. The engine 10 will be of a type that can operate, without damage, in an inverted position as, for example, a two-cycle engine.

Extending from the engine 10 is a boom 26 housing a V-belt whereby the rotary output of the engine 10 may be transmitted in the conventional fashion to the abrasive wheel 12. A safety hood 28 is also provided.

The cutting tool defined by the previously described structure mounts a clampable yoke 30 tightenable by a bolt 32 about a sleeve 34 secured to a circular metal plate 36 and journalled about a bolt 38. A circular plate 40 is secured to one end of a link 42 and, together with the plate 36, sandwiches a Teflon washer 44 to provide a bearing. The bolt 38 extends through apertures (not shown) in the plates 36 and 40 as well as the Teflon washer 44, and one end of the link 42 to be received in nuts 46 whereby a pivotal connection of the cutting tool to the link 42 is established.

The end of the link 42 remote from the bolt 38 is pivotally connected to a link 48. Circular plates 50 sandwiching a Teflon washer 52 are employed and a bolt 54 received in nuts 56 complete the pivotal connection. Preferably, Belleville springs 58 are interposed between the bolt or the nuts 56 and the associated one of the links 42 and 48 to minimize side sway in the connection.

The end of the link 48 remote from the bolt 54 is pivotally connected by a bolt 60 to an upstanding plate 62 forming part of the clamp 16. A circular plate 64 and Teflon disc 66 are employed in the connection in a fashion similar to that previously described as are Belleville washers 68. It will be noted that the pivotal connections defined by the bolts 38, 54 and 60 have parallel pivot axes and all extend generally parallel to the direction of elongation of the railroad rail 18.

The plate 62 is secured to one end of an open ended tubular base 70 whose underside is adapted to be in contact with the upper surface of the head 72 of a rail 18, as illustrated in FIG. 3. Extending from the upper surface of the tubular base 70 to the plate 62 are reinforcing webs 74.

One side of the tubular base 70 mounts a pair of depending fingers 76, each having an inwardly, diagonally extending lower extremity 78 for engagement with one of the lower corners of the railhead 72. The tubular base 70 also mounts a horizontally extending threaded shaft 80 which receives a nut 82 provided with wing-like handles 84 to define a clamp. Slidably received on the shaft 80 between the nut 82 and the tubular base 70 is a generally C-shaped finger 84 which is located to be opposed to the fingers 76. The upper surface 86 of the finger 84 slidably rides on the upper surface of the tubular base 70. The lower end of the finger 84 is provided with an inwardly directed, diagonal surface 90, also for engagement with a lower corner of the railhead 72. As will be appreciated, tightening of the nut 82 through use of the wing-like handles 84, will cause the base 70 to be firmly affixed to the rail 18.

As is well known, various size rails are employed in various rights-of-way, depending upon expected traffic conditions. In order to facilitate use of the cutting tool with rails of varying sizes, the rail receiving channel defined by the base 70 and the fingers 76 and 84 is provided with means whereby its depth can be selectively varied.

Specifically, and with reference to FIGS. 3 and 4, there is provided an adapter plate 100 which, by means of a screw 102 and a wing nut 104, may be secured to the lowermost surface of the base 70, as illustrated in FIG. 4, for the lighter weights of rail and, which, alternatively, may be disposed within the open end of the tubular base 70 and held in place as illustrated in FIG. 3 where heavier weights of rail are to be worked upon. Preferably, and as illustrated, the bolt 102 is of the flat head variety and the adapter plate 100 is provided with a countersunk aperture 106 for receipt of the flat head of the bolt 102 when the adapter plate is disposed in abutment with the underside of the tubular base 70.

Finally, if desired, a pair of sleeves 110 may be secured to the tubular base 70 on the side thereof adjacent the finger 84 for receipt of an elongated gauging device 112 which may be employed when the apparatus is clamped to a rail to ensure that the cut will occur precisely at the desired location on the rail.

In use, the apparatus will be clamped to a rail such that the abrasive wheel 12 will encounter and cut the rail at the desired location. The cutting tool is extended to one side of the rail and the engine 10 started. The tool will then be oscillated rapidly about the pivot defined by the bolt 38 for rapid cutting of the rail. As the cutting progresses, the abrasive disc 12 may be moved inwardly into the cut while being oscillated by reason of the relative pivoting of the links with respect to the base about the pivots defined by the bolts 54 and 60. When the maximum permissible depth of cut has been achieved on one side of the rail, the cutting apparatus need merely be swung as illustrated in FIG. 1 to a position on the opposite side of the rail and the cutting continued. In this respect, the positioning of the pivot axis defined by the bolt 60 vertically above the rail-receiving channel defined by the base 70 and the fingers 76 and 84 ensures that the cut through the rail may be completed regardless of rail size without removing the apparatus from the rail.

It will also be appreciated that by reason of the connection of the cutting tool to the link 42, the cutting tool may be easily removed from the remainder of the apparatus for hand-held cutting operations simply by loosening the bolt 32.

I claim:

1. In a rail cutting apparatus, the combination of:
a base adapted to be disposed on the head of a rail;
opposed, inwardly directed fingers on said base for disposition about the head of a rail, the finger(s) on one side of the base being movable toward the opposed finger(s);
means for applying a clamping force to said fingers to clamp said base to the head of a rail;
a pair of links having adjacent ends pivotally interconnected for relative rotation about an axis generally parallel to the direction of elongation of the head of a rail;
means pivotally connecting an end of one of said links remote from said adjacent end to said base for limited rotation about an axis parallel to said one axis;
a cutting tool pivotally connected to the end of the other link remote from said adjacent end,
whereby when said apparatus is clamped to a rail, said cutting tool may be swung to either side thereof to cut the rail without removing said apparatus from the rail;
said base being an open-ended tube; and further including an adapter plate adapted to be interposed between said base and a railhead to adapt said apparatus for cutting rail of differing weight; and means for selectively securing said adapter plate in
 a. a first position against the underside of said base, and
 b. a second position stored within said tube.

2. A rail cutting apparatus comprising:
a base adapted to be disposed on the head of a rail;
opposed, inwardly directed fingers on said base defining a rail receiving channel for disposition about the head of a rail, the finger(s) on one side of the base being movable toward the opposed finger(s);
means for applying a clamping force to said fingers to clamp said base to the head of a rail;
linkage means;
means pivotally connecting said linkage means to said base for limited rotation about an axis in alignment with said channel; and
a cutting tool pivotally connected to said linkage means remote from said axis,
whereby when said apparatus is clamped to a rail, said cutting tool may be swung to either side thereof to cut the rail without removing said apparatus from the rail;
said linkage means comprising a pair of links, a pivot pin extending between and interconnecting said links, enlarged, complementary bearing surfaces at said pivot pin, and spring means biasing said links together along said pivot pin.

3. A rail cutting apparatus comprising:
a base adapted to be disposed on the head of a rail;
opposed, inwardly directed fingers on said base defining a rail receiving channel for disposition about the head of a rail, the finger(s) on one side of the base being movable toward the opposed finger(s);
means for applying a clamping force to said fingers to clamp said base to the head of a rail;
linkage means;
means pivotally connecting said linkage means to said base for limited rotation about an axis in alignment with said channel; and
a cutting tool pivotally connected to said linkage means remote from said axis,
whereby when said apparatus is clamped to a rail, said cutting tool may be swung to either side thereof to cut the rail without removing said apparatus from the rail;
said base including an upstanding plate pivotally mounting said linkage means, and a stop carried by said linkage means and positioned to be engageable with said plate to limit rotation of said linkage means about said axis.

* * * * *